United States Patent [19]

Dellinger

[11] Patent Number: 4,948,289

[45] Date of Patent: Aug. 14, 1990

[54] SUPPORT FRAME CORNER CONNECTOR

[76] Inventor: Drew E. Dellinger, P.O. Box 471, Milton, Fla. 32572

[21] Appl. No.: 319,715

[22] Filed: Mar. 7, 1989

[51] Int. Cl.$^5$ .............................................. F16B 9/00
[52] U.S. Cl. ...................................... 403/246; 403/49; 403/262; 135/106
[58] Field of Search ................ 403/192, 49, 246, 199, 403/231, 262, 263, 174, 178; 135/106, 101

[56] References Cited

U.S. PATENT DOCUMENTS

| | | |
|---|---|---|
| 1,824,631 | 9/1931 | Rensselaer et al. . |
| 2,535,618 | 12/1950 | Williams . |
| 2,565,746 | 8/1951 | Turner . |
| 2,588,905 | 3/1952 | Blackburn ............................ 403/49 |
| 2,624,429 | 1/1953 | Resselaer et al. . |
| 2,723,673 | 11/1955 | Call ................................. 135/106 X |
| 2,764,107 | 9/1956 | Niswonger et al. . |
| 2,836,860 | 6/1958 | Staropoli ......................... 135/106 X |
| 3,263,692 | 8/1966 | Questi et al. ........................ 135/106 |
| 4,025,211 | 5/1977 | Gump ................................ 403/49 X |
| 4,039,264 | 8/1977 | Sharp . |
| 4,405,254 | 9/1983 | Tooley . |
| 4,439,052 | 3/1984 | Wallther ......................... 403/246 X |
| 4,445,307 | 5/1984 | Puccinelli et al. . |
| 4,576,500 | 3/1986 | Wong . |

FOREIGN PATENT DOCUMENTS 1057155  3/1954  France ................................. 135/106

Primary Examiner—Peter M. Cuomo
Attorney, Agent, or Firm—Fleit, Jacobson, Cohn, Price, Holman & Stern

[57] ABSTRACT

A peripheral support frame is provided over which to receive and for supporting a flexible canopy or tent cover. The frame includes a plurality of horizontally elongated peripheral frame members with peripherally adjacent frame members including a pair of adjacent ends and an upstanding leg assembly is disposed between and provided for support of each pair of adjacent frame member ends. Each leg assembly includes an upper head from which the adjacent peripheral frame member ends are removably supported against angular displacement relative to the associated leg assembly about axes extending longitudinally of the peripheral frame members with only a single shank-type fastener being secured between each peripheral frame member end and the associated leg assembly subject only to tensional forces.

11 Claims, 3 Drawing Sheets

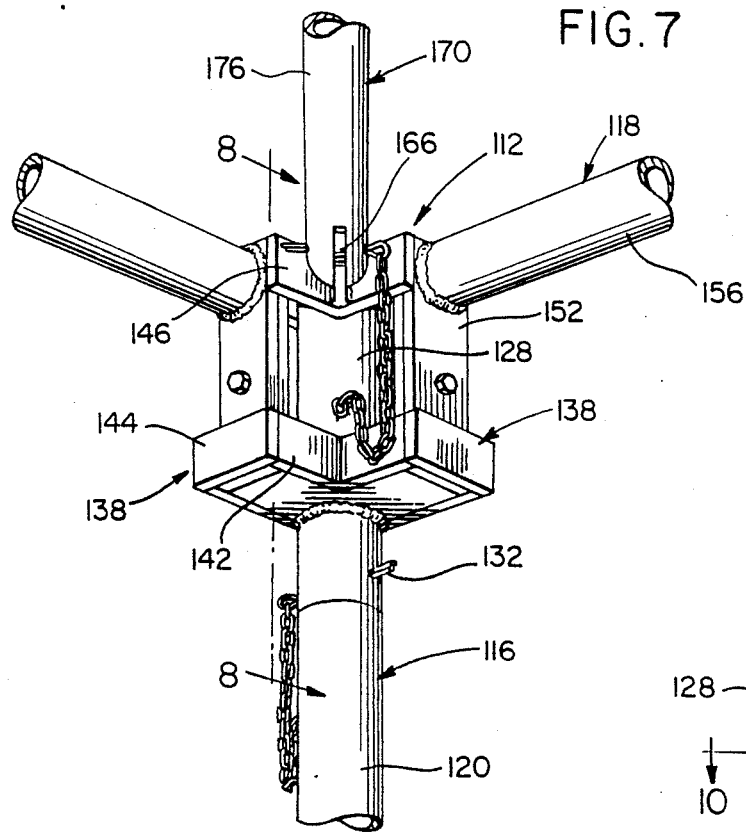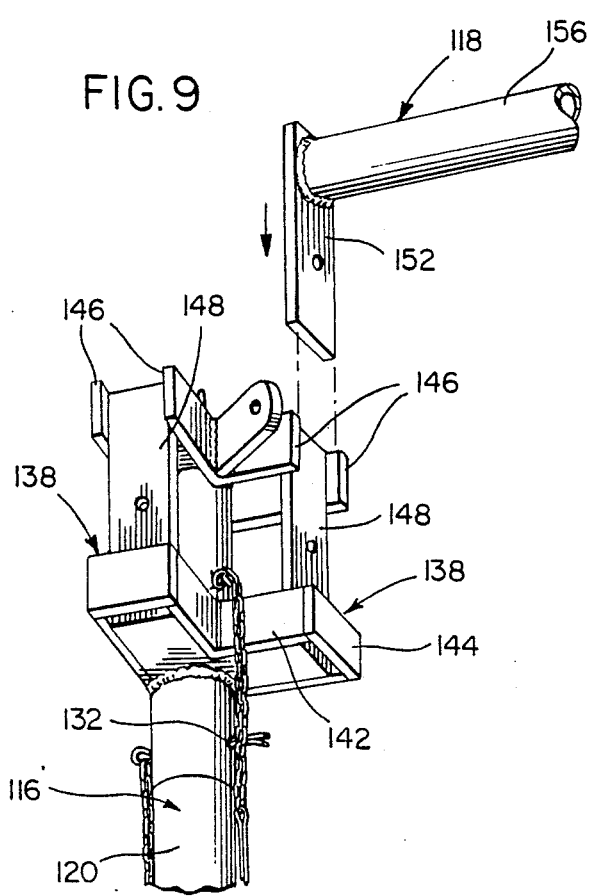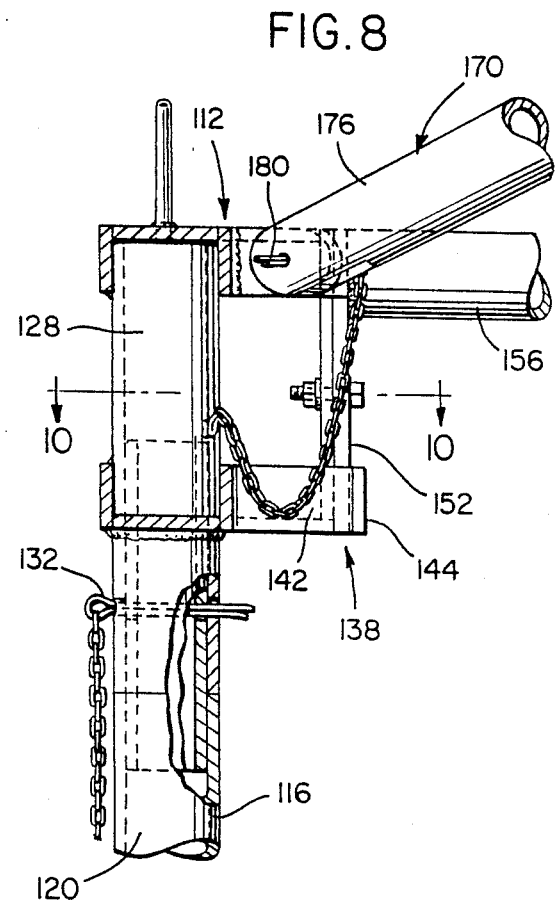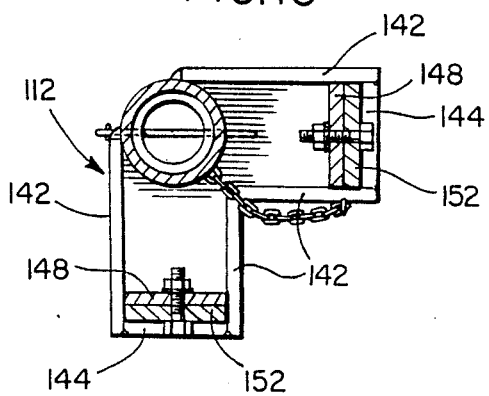

SUPPORT FRAME CORNER CONNECTOR

BACKGROUND OF THE INVENTION

1. Field of the Invention

This invention relates to a connector for use between end adjacent horizontal frame peripheral side members and may be used between end aligned frame side members as well as adjacent ends of frame side members angularly displaced relative to each other about a vertical axis in order to form a frame corner. Although the connector is primarily designed for use in erecting upper support frames for open sided tents (canopies) the connector also may be used in constructing the upper peripheral support frame of a tent including side walls.

2. Description of Related Art

Various different forms of peripheral frames and connectors for adjacent peripheral frame components to be utilized in erecting tents and other structures and which include some of the general structural and operational features of the instant invention are disclosed in U.S. Pat. Nos. 1,824,631, 2,535,618, 2,565,746, 2,624,429, 2,764,107, 3,263,692, 4,039,264, 4,405,254, 4,445,307 and 4,576,500. However, these previous prior U.S. patents do not disclose the overall combination of structural features incorporated in the instant invention and which coact with each other to provide a tent or canopy frame which may be quickly and easily erected and dismantled without skilled labor.

SUMMARY OF THE INVENTION

According to the present invention, connecting structure is provided at the top of a support post or leg for joining adjacent ends of horizontal peripheral frame members. The connecting structure may be provided on the top of an associated post or leg for joining end aligned peripheral frame members or adjacent ends of relatively angulated peripheral frame members. The connecting structure, for each associated peripheral frame member, includes a mount extending vertically along the associated post or leg and anchored thereto at vertically spaced locations. In addition, each associated peripheral frame member end includes a vertical piece mounted therefrom and for operative association with vertically spaced portions of the associated mount, whereby an extremely strong connection between each peripheral frame member and the associated post mounted connecting structure is provided. Furthermore, each peripheral frame member vertical piece is loosely telescopingly engageable with the corresponding connecting structure mount for ease of assembly and each mount and the associated peripheral frame member vertical piece ultimately are secured to each other by a shank-type fastener and the loose telescopic connection between each mount and the associated vertical piece of a peripheral frame member is such that the associated shank-type fastener is relieved of all sheer forces thereon and required to withstand only tension forces for which it has been designed to withstand.

The main object of this invention is to provide a horizontal support frame with depending legs and which may be readily erected by unskilled work persons and thereafter utilized as a support for a canopy or tent covering.

Another object of this invention is to provide a support frame in accordance with the preceding objects and which utilizes only a single shank-type fastener at each connection between a peripheral frame member and a support post or depending leg therefor.

Yet another object of this invention is to provide a support frame whose immediately above referred to shank-type fasteners are subject to tension forces, only.

A further object of this invention is to provide a peripheral support frame for a canopy or tent and including structure anchored relative to the support frame and comprising a center support for a canopy or tent peak area.

A final object of this invention to be specifically enumerated herein is to provide a legged peripheral frame for a canopy or tent and which will conform to conventional forms of manufacture, be of simple construction and easy to erect and disassemble so as to provide a device that will be economically feasible, long-lasting and trouble free to erect and disassemble.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 7 is a fragmentary perspective view similar to FIG. 8 but illustrating a modified form of post or leg mounted connecting structure for joining adjacent peripheral frame members;

FIG. 8 is an enlarged fragmentary vertical sectional view taken substantially upon the plane indicated by the section line 8—8 of FIG. 7;

FIG. 9 is a perspective view similar to FIG. 8 but with one peripheral frame member removed and the other peripheral frame member in exploded position; and FIG. 10 is a horizontal sectional view taken substantially upon the plane indicated by the section line 10—10 of FIG. 8.

DESCRIPTION OF THE PREFERRED EMBODIMENT

Figure 1:
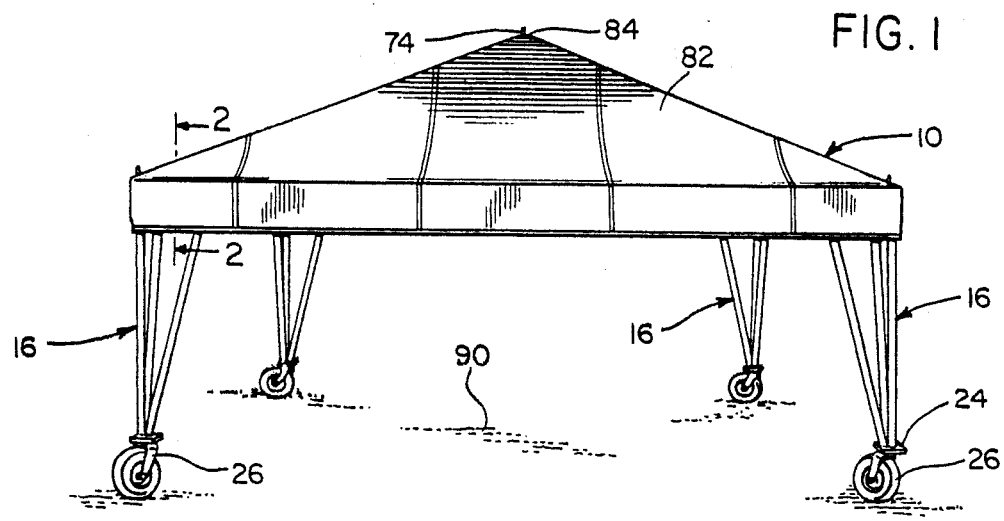
FIG. 1 is a perspective view of a partially skirted canopy supported from a legged support frame constructed in accordance with the present invention.

Referring now more specifically to the drawings, the numeral 10 generally designates, in FIG. 1, a skirted canopy or tent including a support frame referred to in general by the reference numeral 12 (FIG. 2) including four corner leg assemblies or posts 16.

With attention invited more specifically to FIGS. 2-6, the support frame 12 includes four horizontal peripheral frame members referred to in general by the reference numeral 18 and four leg assemblies 16 connecting adjacent ends of adjacent peripheral frame members 18.

Each leg assembly or post 16 includes one vertical leg 20 and a pair of associated upwardly divergent inclined legs 22, the lower ends of each set of legs 20 and 22 being fixedly secured, as by welding, to a lower plate 24 beneath which a deregible wheel assembly 26 is supported. The wheel assemblies 26, if desired, may be provided with selectively actuatable brake assemblies (not shown).

The support frame 12 is rectangular in plan shape and the inclined legs 22 of each leg assembly or post 16 are inclined upwardly and outwardly from sides of the corresponding leg 20 angularly displaced 90° apart.

Each leg assembly or post 16 includes a horizontal right angle head 28 including a depending shank 30 supported from its apex portion and downwardly telescoped into the upper end of the leg 20 and secured therein by a fastener 32 and a pair of depending end shanks 34 downwardly telescoped into the upper ends of the legs 22 and secured therein by fasteners 36, the connections at 32 and 36 being releasable, if desired.

Each of the shanks 34 includes connecting structure referred to in general by the reference numeral 38. Each connecting structure 38 includes a lower outstanding flange 40 having its inner end welded to the shank 34 and each outstanding flange 40 has a pair of opposite side upstanding flanges 42 secured along opposite sides thereof, projecting upwardly therefrom and also secured to the shank 34, the outer ends of the upstanding flanges 42 being bridged by a transverse bridging flange 44. Also, each shank 34 includes an upper pair of upstanding side flanges 46 corresponding to the flanges 42 and secured to opposite sides of the corresponding end of the head 28 and to the shank 34. A vertical abutment strap 48 has its upper end secured between the flanges 46 inwardly of the outer ends thereof and also to the adjacent end of the head 28 which extends over the shank 34. The lower end of the abutment strap 48 is secured between the flanges 42 inwardly of the outer ends thereof and to the outstanding flange 40 inwardly of the bridging flange 44. The approximate vertical mid-portion of the vertical abutment strap 48 has a bore 50 formed therethrough, the upper and lower pairs of flanges 46 and 42 and the abutment strap 48 defining a vertical passage opening upwardly and horizontally outwardly at its upper end between the flanges 46 and closed in a horizontally outwardly facing direction at its lower end by the bridging flange 44.

Each peripheral frame member 18 includes a rigid vertical end member 52 at each end and each vertical end member 52 is in the form of a strap member and includes a pair of vertically spaced horizontally outwardly projecting shank members 54 supported therefrom. Also, each peripheral frame member 18 includes a pair of vertically spaced horizontal rigid tube members 56 telescoped over and secured to the corresponding shank members 54 as at 58 at their opposite ends, the connections at 58 being removable, if desired. In addition, each vertical end member 52 is provided with a horizontal bore 60 registrable with the corresponding bore 50.

Figure 4:
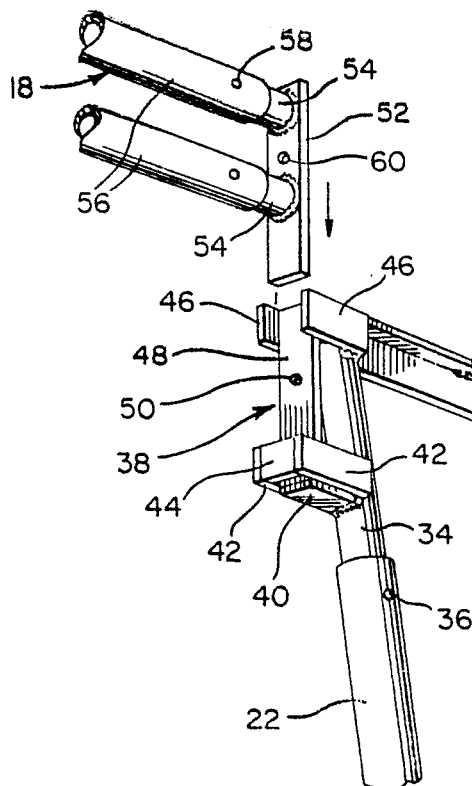
FIG. 4 is a fragmentary enlarged perspective view of one corner portion of the support frame illustrated in FIGS. 2 and 3 and with one side rail or member portion of the frame in exploded position.
Figure 4:
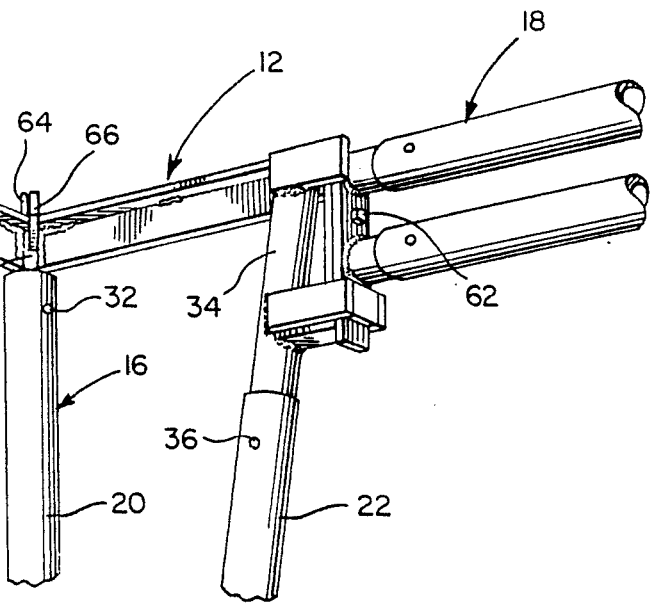
Figure 5:
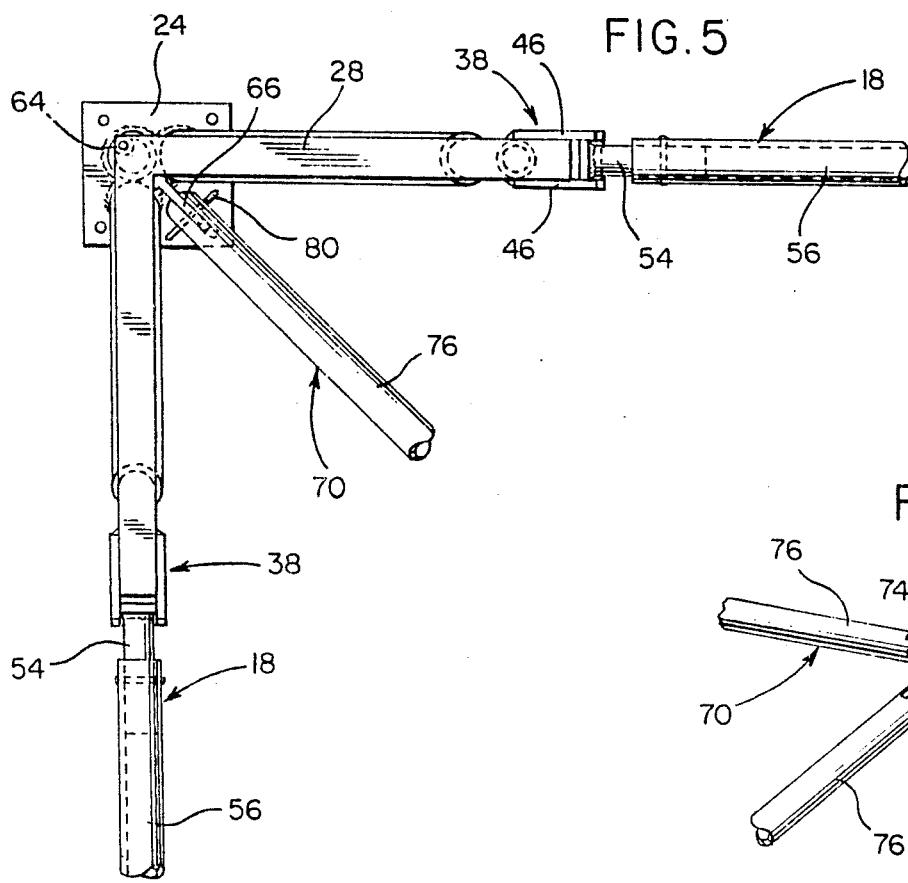
FIG. 5 is a fragmentary top plan view of the assemblage illustrated in FIG. 4 and with one inclined leg portion of a peak support operatively associated therewith.
Figure 6:
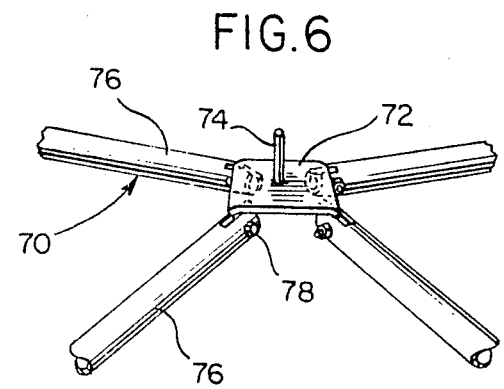
FIG. 6 is a fragmentary perspective view of the central portion of the peak support to be utilized in conjunction with the structure illustrated in FIGS. 1-5.

From FIG. 4 of the drawings it may be seen that each vertical end member 52 may be downwardly engaged with the corresponding connecting structure such that the vertical end member 52 is loosely received between the upper and lower pairs of flanges 46 and 42 and the lower end of the vertical end member 52 received between the lower end of the vertical abutment strap 48 and the bridging flange 44. This type of telescopic connection is reasonably loose, but not sloppy, to enable ready engagement of each vertical end member 52 with the corresponding connecting strap 38. After each vertical end member 52 has been removably engaged with the corresponding connecting structure 38, a shank-type fastener 62 designed to resist tension forces is installed through the registered bores 50 and 60.

The upper end of each shank 30 includes an upwardly projecting stud 64 and an inwardly and upwardly inclined apertured flange 66. Once the four leg assemblies or posts 16 have been interconnected through the utilization of the four peripheral frame members 18, a peak support structure referred to in general by the reference numeral 70 is mounted relative to the leg assemblies 16. The peak support structure 70 includes a center plate 72 equipped with an upstanding shank 74 and four upwardly convergent arms 76 whose upper ends are pivotally mounted from corresponding corner portions of the plate 72 as at 78, the lower ends of the arms 76 being removably pinned to the flanges 66 as at 80.

Once the completed support frame 12 has been erected, the tent or canopy cover 82 may be disposed over the support frame 12 with a center grommet 84 receiving the shank 74 therethrough and four corner grommets 86 receiving the shanks 64 therethrough. Of course, the wheel assemblies 26 enable the canopy or tent 10 to be shifted in position as desired. However, suitable ground anchors (not shown) may be used in conjunction with each leg assembly 16 in order to removably secure the latter in position relative to the ground 90 upon which the wheel assemblies 26 are disposed.

Figure 2:
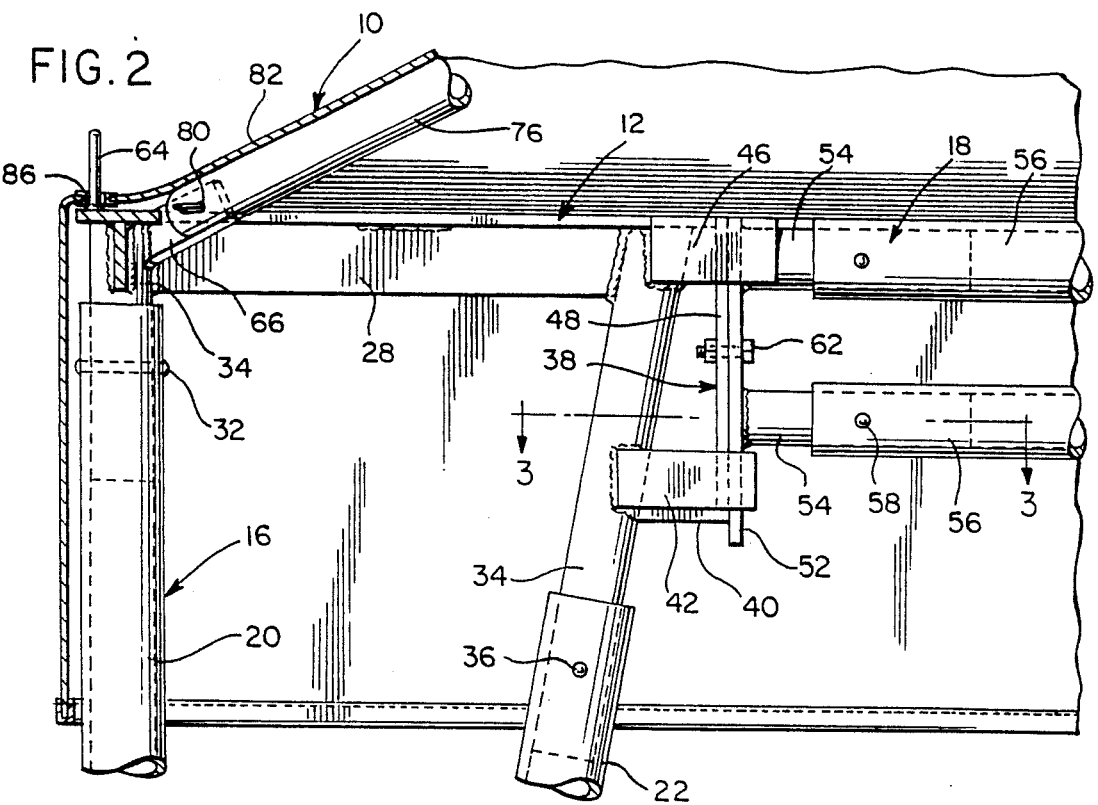
FIG. 2 is an enlarged fragmentary vertical sectional view taken substantially upon the plane indicated by the section line 2—2 of FIG. 1.
Figure 3:
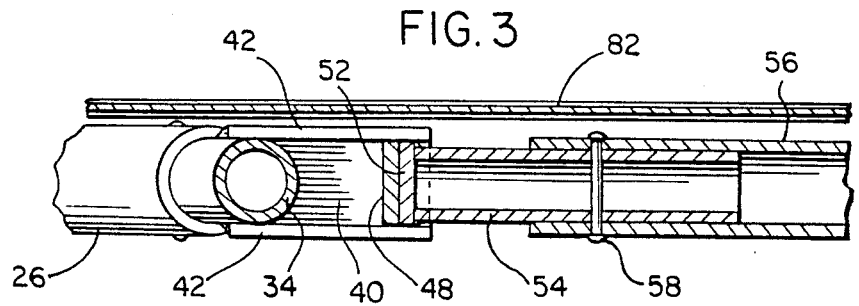
FIG. 3 is an enlarged fragmentary horizontal sectional view taken substantially upon the plane indicated by the section line 3—3 of FIG. 2.

From FIGS. 2 and 4 of the drawings it may be seen that each connecting structure 38 enjoys vertically spaced structures for each peripheral frame member end preventing that peripheral frame member end from being angularly displaced relative to the post 16 about a horizontal axis extending longitudinally of the peripheral frame member 18 and that the single fastener 62 utilized to secure each peripheral frame member 18 to a corresponding connecting structure 38 is therefore subject only to tension forces. Furthermore, each vertical end member may be loosely engaged with the corresponding connecting structure 18 independent of usage of the corresponding fastener 62 until all vertical end members 52 have been engaged with the corresponding connecting structures 38. Then, the various fasteners 62 may be installed.

Of course, the tubes 56, if removable from the shank members 54, may be made of different lengths to thereby enable the support frame 12 to be utilized in conjunction with different dimension covers 82. Furthermore, if the tubes 56 are removable from the shank members 54, the support frame 12 may be broken down into smaller components for storage and shipment.

With attention now invited more specifically to FIGS. 7—10, there may be seen a modified form of support frame referred to in general by the reference numeral 112. The support frame 112 includes various components referred to by reference numerals in the 100 series corresponding to the reference numerals designating similar components of the support frame 12.

The support frame 112 includes posts or leg assemblies 116 which incorporate only single legs 120 and the heads 128 of the posts 116 are removably supported therefrom as at 132 and include connecting structures 138 corresponding to the connecting structures 38. The peripheral frame members 118 corresponding to the frame members 18 include only single tubes 156 to whose opposite ends vertical end members 152 corresponding to the end members 52 are secured and each connecting structure 138 includes upper and lower pairs of flanges 146 and 142 corresponding to the flanges 46 and 42 as well as a bridging flange 144 corresponding to the bridging flange 44. Also, each leg assembly 116 includes a flange 166 corresponding to the flange 66 and from which the corresponding arm 176 of a peak support structure 170 corresponding to the peak support structure 70 is removably secured as at 180.

Accordingly, the support frame 112 is structurally and operationally equivalent to the support frame 12, except that the leg assemblies or posts 116 thereof include only single legs 120 as opposed to three upwardly divergent legs. In addition, the peripheral frame members 118 include only single tubes 156.

Although the leg assemblies 16 and 116 are only illustrated at the corners of the frames 12 and 112, the connecting structures 38 and 138 may be mounted from opposite sides of the corresponding leg assemblies to enable each side of a tent to be increased in length and include a mid-length leg assembly.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A leg assembly to be used in erecting a tent about whose outer periphery a plurality of leg assemblies are spaced with at least one horizontal marginal side rail extending between and removably interconnecting each pair of peripherally adjacent leg assemblies, said leg assembly including an upstanding leg structure having upper and lower end portions, said lower end portion being adapted to be supported from a suitable upwardly facing support surface, said upper end portion including a pair of upwardly opening and generally horizontally outwardly facing side rail seat structures spaced about said upper end portion and facing outwardly therefrom in different horizontal directions, each of said seat structures defining vertically extending elongated abutment surface means, having upper and lower end portions, facing generally horizontally outwardly in the corresponding direction and an upwardly opening generally vertical sleeve portion including a first wall surface generally coextensive with the lower end portion of said abutment surface means, the upper end portion of each abutment surface means including a pair of parallel, opposite side, vertically elongated and outstanding flanges projecting outwardly from said abutment surface means in said corresponding direction and spaced appreciably above the corresponding sleeve portion each abutment surface means, outstanding flanges and the corresponding sleeve portion being adapted to coact with a depending flange carried by the adjacent end of a corresponding side rail for support of said side rail adjacent end from said leg assembly with the lower end portion of said depending flange downwardly received in said sleeve portion, the upper portion of said depending flange secured between said outstanding flanges and substantially the full length of said depending flange abuttingly opposing said abutment surface means.

2. The leg assembly of claim 1 wherein each abutment surface means, above said sleeve portion and below said outstanding flanges, includes a horizontal bore formed centrally therethrough with which a corresponding bore formed through said depending flange is adapted to be registered, whereby a shank-type fastener may be removably secured through said registered bores.

3. A cover support frame including a plurality of horizontally elongated peripheral frame members with each pair of peripherally adjacent frame members including a pair of adjacent ends, an upstanding leg assembly disposed between and for support of each pair of adjacent frame member ends, each leg assembly including an upper end head, each head including a pair of horizontally outwardly facing and vertically elongated abutment surface means facing outwardly from the sides of said leg assembly in which the corresponding peripheral frame members extend, each peripheral frame member including a vertically elongated end member mounted therefrom abuttingly opposing the corresponding abutment surface means, each abutment surface means including vertically spaced upper and lower pairs of outstanding opposite side flanges mounted therefrom between which the upper and lower portions of the corresponding end member are loosely received, and elongated tension force resisting fastener means removably secured through the vertical mid-portion of each said end member and the corresponding abutment surface means, a bridging member secured between each lower pair of side flanges defining, together with said side flanges and the lower portion of the corresponding vertically elongated abutment surface means, an upwardly opening sleeve in which the lower portion of the corresponding end member is received.

4. The support frame of claim 3 wherein said frame is substantially rectangular in plan and includes four leg assemblies and four peripheral frame members.

5. The support frame of claim 4 including a peak support structure, said support structure including a central upper support plate and four downwardly and outwardly inclined arms removably pinned, at their upper ends, to peripherally spaced portion of said plate and at their lower ends to said heads.

6. The support frame of claim 3 wherein each leg assembly includes a single leg.

7. The support frame of claim 3 wherein each leg assembly includes three upwardly divergent legs whose upper ends are interconnected by said head.

8. The support frame of claim 3 wherein the lower end of each leg assembly includes a support wheel assembly.

9. The support frame of claim 3 wherein each peripheral frame member includes a single elongated tube extending between the opposite ends thereof.

10. The support frame of claim 3 wherein each peripheral frame member includes a pair of vertically spaced elongated tubes extending between the opposite ends thereof.

11. An upstanding leg assembly and peripheral frame member combination to be used in erecting a tent about whose outer periphery a plurality of said leg assemblies are spaced and with each pair of peripherally adjacent leg assemblies having their upper ends connected by one of said peripheral frame members extending and connected therebetween, said leg assembly of said combination including upper and lower ends, said upper end including vertically spaced upper and lower pairs of outstanding side flanges projecting outwardly of each of two sides of said upper end facing outwardly therefrom in different horizontal directions, a vertical abutment strap extending between corresponding upper and lower pairs of said side flanges with the upper end lower ends of each abutment strap secured between the corresponding upper and lower pairs of side flanges intermediate said upper end of said leg assembly and the outer ends of said side flanges, at transverse bridging flange extending and secured between the outer ends of each lower pair of opposite side flanges outwardly of the lower end of the corresponding vertical abutment strap, the lower end of each abutment strap and the corresponding side flanges and bridging flange defining an upwardly opening sleeve portion adjacent the lower end of the last mentioned abutment strap, said peripheral frame member being horizontally elongated and including opposite ends, each of said opposite ends including a vertical end member having upper and lower ends, the lower end of one of said vertical end members being downwardly telescoped into a corresponding sleeve portion, the upper end of said one vertical end member being received between the corresponding upper pair of outstanding flanges and at least substantially the full length of said one vertical end member and the corresponding vertical abutment strap being disposed in surface to surface abutting relation, the vertical mid-portions of said one vertical end member and the corresponding vertical abutment strap being provided with registered horizontal bores having an elongated tension force resisting fastener removably secured therethrough.

* * * * *